United States Patent [19]

Austin

[11] Patent Number: 4,588,227
[45] Date of Patent: May 13, 1986

[54] FURNITURE ASSEMBLY
[75] Inventor: Barry G. Austin, Marshall, Mich.
[73] Assignee: General Aluminum Products, Inc., Charlotte, Mich.
[21] Appl. No.: 625,706
[22] Filed: Jun. 28, 1984
[51] Int. Cl.⁴ .......................... A47C 5/10; A47C 4/02
[52] U.S. Cl. .................................. 297/440; 297/445; 403/255
[58] Field of Search .................... 297/440, 441, 445; 24/614, 615, 625; 211/182; 248/188.9; 403/252, 254, 255, 329, 330

[56] References Cited

U.S. PATENT DOCUMENTS

| | | |
|---|---|---|
| 77,608 | 5/1868 | Hale et al. ........................ 24/614 |
| 1,403,423 | 1/1922 | Le Duc . |
| 1,456,800 | 5/1923 | Headley ........................ 297/445 X |
| 2,350,640 | 6/1944 | Rorke . |
| 2,854,062 | 9/1958 | Hetchler . |
| 3,003,817 | 10/1961 | King . |
| 3,379,474 | 4/1968 | Schwarz, Jr. . |
| 3,601,176 | 8/1971 | Savickas ........................ 297/445 X |
| 3,640,576 | 2/1972 | Morrison . |
| 3,643,997 | 2/1972 | Gilbert . |
| 3,645,550 | 2/1972 | Biehl ........................ 297/445 X |
| 3,650,563 | 3/1972 | Hansson . |
| 3,677,601 | 7/1972 | Morrison . |
| 3,695,702 | 10/1972 | Ingellis . |
| 3,726,561 | 4/1973 | Bolyos . |
| 3,778,175 | 12/1973 | Zimmer . |
| 3,873,154 | 3/1975 | Baker, Jr. ........................ 297/445 |
| 3,883,104 | 5/1975 | Delafield . |
| 3,952,463 | 4/1976 | Lane ........................ 52/63 |
| 4,036,371 | 7/1977 | Michel . |
| 4,146,269 | 3/1979 | Beckley . |
| 4,389,759 | 6/1983 | Yuda ........................ 24/614 |

FOREIGN PATENT DOCUMENTS

| | | | |
|---|---|---|---|
| 1399355 | 4/1965 | France ........................ 403/347 |
| 653248 | 2/1963 | Italy ........................ 297/440 |

Primary Examiner—William E. Lyddane
Assistant Examiner—Peter R. Brown
Attorney, Agent, or Firm—Price, Heneveld, Huizenga & Cooper

[57] ABSTRACT

A seating unit that includes two side support assemblies and a plurality of lateral connecting rods which are received in mounting apertures through the side assemblies. A securing clip is received inside the hollow ends of each lateral connecting rod to prevent the side assemblies from separating. Each clip has a pair of extending legs with a locking tab that seats in a recess within the lateral rod. The lateral rods flex under the weight of a person seated on the seating unit in order to create a frictional locking force between the lateral rods and side assemblies to prevent the side assemblies from sliding toward each other.

20 Claims, 6 Drawing Figures

FURNITURE ASSEMBLY

BACKGROUND OF THE INVENTION

The present invention relates to furniture assemblies and in particular to seating units which may be disassembled for transportation and storage.

Furniture items are normally bulky, cumbersome goods that demand a large area for transportation, storage and display. The relatively large amount of space required for most furniture items greatly increases the expense and handling difficulties associated with the distribution of these goods. Heretofore, furniture manufacturers have attempted to reduce these problems by the construction of furniture which is foldable or may be disassembled during transportation or storage. Although alleviating handling problems to some degree, previous folding or "knock-down" furniture designs present problems not present in other furniture pieces.

One problem common to most folding furniture, such as folding chairs or the like, is that when set up the furniture presents a relatively inexpensive and obviously impermanent appearance. More preferable from an aesthetic point of view is furniture that has a solid, permanent look when displayed and used. For this reason, although folding furniture is often used to handle large groups on specific occasions, folding chairs and the like are generally unsatisfactory as a permanent house or patio furnishing. On the other hand, furnishings which can be disassembled or "knocked-down" for storage and later reassembled may provide a desirable solid, permanent appearance. The difficulty with such furnishings is that in order to obtain this permanent appearance, a complex or difficult assembly procedure is normally required. Essentially, a consumer is required to construct the furniture item himself from separate elements and is often required to use various tools on the fasteners connecting the elements. Due to the aversion many consumers have to complex assembly procedures, a furniture distributor is often required to assemble the furniture prior to sale.

One common use for such folding or knock-down furniture is as lawn or patio furniture. In such an application, it is highly desirable that the furniture be both lightweight and inexpensive. For this reason such furniture has often been made from tubular aluminum frames with interlaced webbing that forms the seat and back. In addition to the problems of complex assembly and an overall "cheap" appearance, these aluminum frames are also readily bent or damaged.

It has been proposed heretofore to utilize extruded plastic pipe for the structural components of such knock-down furniture. The resultant furniture articles have been, generally speaking, very satisfactory from both an aesthetic and structural standpoint. Assembly procedures, however, have been relatively complicated at best. Prior attempts to simplify these procedures have generally resulted in increased manufacturing costs.

SUMMARY OF THE INVENTION

The present invention alleviates the problems associated with the transportation and storage of furniture items by the provision of a seating unit which may be transported and stored in a disassembled, substantially flat condition. Even though the seating unit is readily stored, upon assembly the seating unit presents a solid, finished appearance. The seating unit therefore includes a finished pair of side assemblies which include aligned mounting apertures for the receipt of lateral support rungs. A number of support rungs are fitted through sleeves on a flexible seat support and are then inserted through the mounting apertures in the side assemblies. Fastener clips are inserted and locked into the ends of the lateral support rods and a cushion is supported on the flexible sling-like seat support.

In one aspect of the invention, the seating unit provides a furniture item which is readily stored and transported but which is quickly and easily assembled by hand without the use of tools. A purchaser may readily assemble the seating unit without the requirement of complicated instructions or the use of special equipment.

In another aspect of the invention, the seating unit includes a hand-assemblable fastener system. The fastener system includes a semi-resilient clip which snaps into the lateral connecting rungs. The operational part of the clip is masked by the lateral joining rung and side assembly, so that when secured together the fastening system presents an aesthetically pleasing finished joint which appears to be factory installed.

Due to the relatively flat storage of the disassembled seating unit, the subject seating unit dramatically reduces the problems associated with the storage and transportation of furniture items. Further, the assembly of the seating unit requires a minimal amount of time and experience. Even though the assembly can be readily completed by virtually any consumer, the final seat assembly provides an attractive, overall factory-assembled appearance. If desired, the seating unit may be later disassembled and reassembled, again without the use of special tools. The resulting seating unit is both lightweight and sturdy while remaining relatively inexpensive to manufacture due to the materials involved.

DETAILED DESCRIPTION OF THE PREFERRED EMBODIMENT

Figure 1:
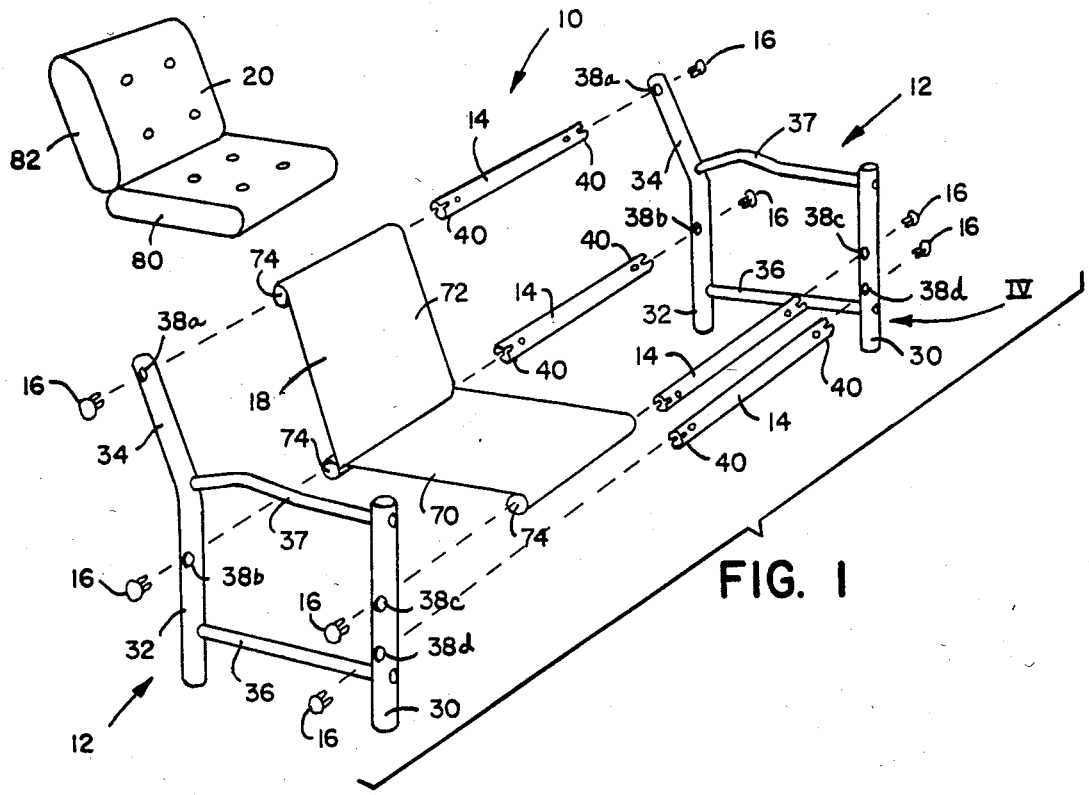
FIG. 1 is an exploded, perspective view of a seating unit embodying the present invention.

The invention is preferably embodied in a seating unit as shown in FIG. 1 and referenced generally as 10. Assembled seating unit 10 includes a pair of spaced side assemblies 12 that are interconnected by four lateral connecting rungs 14. Lateral rungs 14 are secured to side assemblies 12 in part by eight securing clips 16 and in part by the frictional locking forces generated between lateral rungs 14 and side assemblies 12 when a person is seated upon seating unit 10. A flexible seat support member or sling 18 is secured to and supported by lateral rungs 14. Seat support member 18 forms a supporting surface for a seat cushion 20. With securing clips 16 disconnected from lateral rungs 14 and lateral rungs 14 removed from side assemblies 12, seating unit 10 may be shipped and/or stored in a relatively flat condition. In order to assemble seating unit 10, lateral rungs 14 are simply slid through seat support member 18 and side assemblies 12, clips 16 then being manually inserted and secured to lateral rungs 14.

As shown in FIG. 1, side assemblies 12 are formed from identical plastic parts. Each includes a generally vertical, cylindrical front post or leg 30 and a generally vertical, cylindrical rear post or leg 32 that form a support base for seating unit 10. The upper end of rear post 32 extends above front post 30 and is bent into an upwardly, rearwardly extending angle in order to form a back rest 34. Each front post 30 is secured to the corresponding rear post 32 by longitudinal rungs 36 and an arm 37. Additional interconnecting bars or struts may be provided for aesthetic purposes. Arm 37 is bent in order to form a conventionally-shaped chair arm or arm rest. Arms 37 and longitudinal rungs 36 are secured to legs 30 and 32 by any conventional means. Preferably, an integrally molded cap having a distal configuration identical to segment 64 of clip 16 with a cylindrical tube extending therefrom is utilized. The cylindrical tubes are telescoped into the open extremities of rungs 36 and arm 37 after the extremities are received by suitable apertures in posts 30 and 32. A pop rivet is then inserted through the post, rung or arm and the cylindrical tube to retain the components in the desired configuration.

Each front and rear post 30 and 32 includes two through-mounting apertures 38 in which lateral connecting rungs 14 are received during assembly. One aperture 38a is located toward the top of back portion 34 to support a back rest on seating unit 10, while a lower pair of mounting apertures 38b and 38c are horizontally aligned on front post 30 and rear post 32 to support the seat portion of unit 10. Fourth mounting apertures 38d are located on front post 30 to provide structural stability to seating unit 10. Side assemblies 12 may have various other conventional configurations dictated by the particular "style" of seating unit 10 to be provided. For example, side panels or the like may fill in the area between corresponding front posts 30 and rear posts 32.

Figures 5, 6:
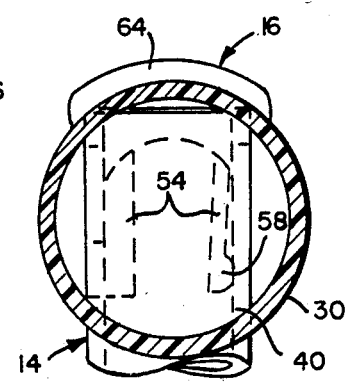
FIG. 5 is a fragmentary, plan view of a lateral connector rod and a fastener clip used in the seating unit of FIG. 1, shown in a connected condition.
FIG. 6 is a fragmentary, sectional bottom plan view of the joint shown in FIG. 4 taken along plane VI—VI.

As shown in FIG. 6, posts 30 and 32 are hollow, tubular posts which may be closed by conventional end caps or castors (not shown). The entirety of side assemblies 12 are manufactured from an extruded, tubular polyvinylchloride material, preferably so-called furniture grade polyvinylchloride of the type sold by Ethyl Corp. under its Index 7140. Posts 30 and 32 preferably have an outside diameter of 1.90 inches and have a wall thickness of 0.142 inch. Posts 30 and 32 are substantially rigid and do not flex substantially under the weight of an average person seated upon seating unit 10. Mounting apertures 38 are cut through posts 30 and 32 and have a diameter slightly undersized with respect to the outside diameter of lateral rungs 14 as pointed out hereinafter.

Figures 2, 3:
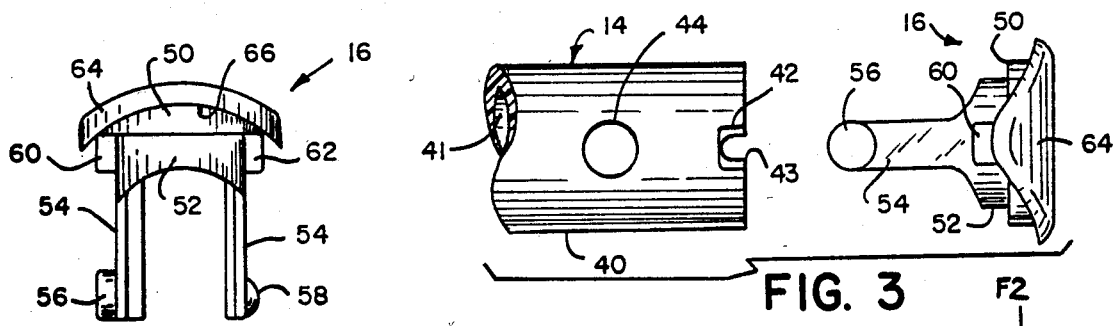
FIG. 2 is a plan view of the fastener clip used in the assembly shown in FIG. 1.
FIG. 3 is a fragmentary, front-elevational view of a lateral connecting rod and a fastener clip used in the seating unit of FIG. 1, shown with the two elements in a separated condition.

Lateral rungs 14 are hollow, tubular members that each include a pair of locking ends 40, shown generally in FIG. 1. Each rung 14 includes an inner sidewall 41 that forms a hollow recess in locking end 40. The hollow recess in locking end 40 permits the receipt of clip 16 therein. As shown in FIG. 3, each locking end 40 includes a pair of longitudinally aligned or indexed, diametrically opposed alignment slots or notches 42 and 43 that extend longitudinally away from the free ends of lateral rung 14. Slot 43 is slightly smaller than slot 42 to provide proper alignment of securing clip 16 in locking end 40 as described below. These slots function, in conjunction with tabs 60 and 62 on clip 16, to carry the torsional loads which are generated when the lateral rungs attempt to rotate.

Spaced from the free end of lateral rung 14 and longitudinally aligned with slot 42 is a circular locking recess 44 that forms an aperture through one side of hollow locking end 40. Both alignment slots 42 and 43 and locking recess 44 are used in the alignment and locking of a securing clip 16 in locking end 40.

Lateral rungs 14 are also extruded from polyvinylchloride material of the type used for side assemblies 12. Preferably lateral rung 14 has an outside diameter one-and-one-eighth inch and a wall thickness of one-eighth inch. Each locking aperture 44 is spaced one-and-one-quarter inch at its furthest point from the free end of lateral rung 14. Locking recess 44 is preferably circular and three-eighths inch in diameter. Locking recess 44 and alignment slots 42, 43 are cut into locking ends 40.

Lateral rungs 14 are sufficiently flexible to bend somewhat when a person is seated upon assembled seating unit 10. This bending of lateral rungs 14 and the frictional properties of the materials from which the elements are made result in a frictional locking force which is used in maintaining seating unit 10 in an assembled condition as described below.

As shown in FIGS. 2 and 3, each securing clip 16 is integrally molded, preferably from the same material as posts 30 and 32. Clip 16 includes a cylindrical disc 50 having a diameter equal to the outside diameter of lateral rungs 14. Projecting from one side of disc 50 is a circular insert 52 that has a diameter to be received snugly within locking ends 40 of lateral rungs 14. A pair of diametrically spaced legs 54 extend from insert 52. Extending to the outer side at the terminal end of one leg 54 is a circular locking tab 56. Locking tab 56 has a diameter which permits tab 56 to be received in locking aperture 44 and a width as viewed from left to right in FIG. 2 slightly less but not exceeding the wall thickness of rungs 44. Protruding outward on the other leg 54 opposite locking tab 56 is a rounded, raised land 58 (FIG. 2) which is used in the locking of securing clip 16 as described below.

Locking tab 56 and aperture 44 into which it is received, while not shown in the drawings, are preferably angled with respect to the longitudinal axis of rungs 44 such that tension forces between clips 16 and rungs 44 tend to force the tab more securely into engagement with the rung. This is accomplished by punching aperture 44 on an angle of approximately 85 degrees with respect to that section of the longitudinal axis of rung 40 lying to the right, as viewed in FIG. 3, of aperture 44. A mating undercut is provided on at least the right-hand end of tab 56 as viewed in FIG. 3. When so configured, tension forces between clip 16 and run 40 tend to wedge tab 56 more tightly into engagement with the rung.

Extending radially outward on insert 52 and aligned with locking tab 56 is a guide tab 60. Guide tab 60 is shaped for receipt in alignment slot 42. Extending radially outward on insert 52 opposite guide tab 60 is another guide tab 62 which is smaller in size than guide tab 60. Smaller guide tab 62 is received in alignment slot 43. Tabs 60 and slots 42 and 43 within which they are received are radiused to alleviate stress concentrations which might otherwise occur.

Figure 4:
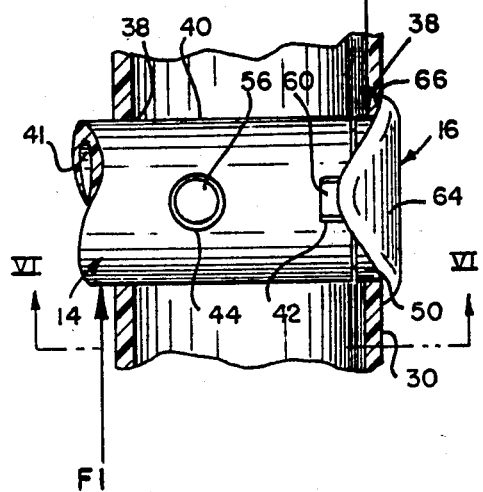
FIG. 4 is a fragmentary, sectional view taken through an assembled joint of the seating unit at location IV in FIG. 1, shown with the elements of FIG. 3 in a connected condition.

On the face of disc 50 opposite insert 52 is a smoothly curved end cap or enlarged flange 64. End cap 64 is bent to form an inner curved surface 66 having a radius of curvature equal to that of posts 30 and 32. As shown in FIG. 4, when assembled, inner surface 66 rests flush against post 30. Although end cap 64 appears circular in end view, due to its curved configuration, end cap 64 is actually an oval which has been bent into a saddle-shape that extends around a portion of the perimeter of posts 30 or 32.

Securing clips 16 are also made from a polyvinylchloride material. Legs 54 are at least semi-resiliently flexible in order to permit locking tab 56 and raised land 58 to be converged toward one another. However, legs 54 are sufficiently stiff that legs 54 resiliently urge locking tab 56 and raised land 58 outward against such compressive forces.

As shown in FIG. 1, seat support member 18 is a flexible fabric or webbing sling having a generally rectangular seat portion 70 joined to a back portion 72. Seat support member 18 is stitched to form a set of mounting sleeves 74 located at the front of seat portion 70, the top of back portion 72 and at the junction between seat portion 70 and back portion 72. Sleeves 74 extend the width of seat support member 18 and have a diameter which permits the receipt of lateral rungs 14 therethrough. When seating unit 10 is assembled, seat support member 18 is tautly secured directly to lateral rungs 14 and is not connected directly to side assemblies 12.

Seat cushion 20 is a conventional seat cushion having a seat 80 and a back 82. Cushion seat 80 and back 82 are flexibly joined and cushion 20 simply rests on seat support member 18.

ASSEMBLY AND DISASSEMBLY

In order to assemble seating unit 10, lateral rungs 14 are slid by hand through mounting apertures 38 on one side assembly 12 until locking ends 40 protrude past posts 30 and 32. Securing clips 16 are inserted and locked into locking ends 40. The rung is then rotated such that decorative flange 64 will nest smoothly with posts 30 and 32. Seat support member 18 is then slid over lateral connecting rods 14 and the other side assembly 12 is secured to lateral connecting rods 14 in a similar manner. Side assemblies 12 are then separated until end caps 64 seat flush against posts 30 or 32.

In order to insert clip 16 into locking end 40, the free ends of legs 54 are resiliently pressed toward each other. Legs 54 are then telescopingly slid into the hollow recess of locking end 40 with locking tab 56 and raised land 58 sliding along inner wall 46. Guide tabs 60 and 62 are aligned with alignment slots 42 and 43 so that locking tab 56 snaps into locking aperture 44, as shown in FIGS. 5 and 6. Raised land 58 will remain in contact with inner wall 46 so that the supporting leg 54 remains in a resiliently flexed condition, FIGS. 5 and 6. This resilient deformation of the leg 54 supporting land 58 increases the resilient pressure forcing locking tab 56 outward and assists in maintaining tab 56 in locking recess 44. As shown in FIGS. 4 and 6, when seating unit 10 is assembled alignment, slots 42 and 43 and locking recess 44 are encompassed by posts 30 or 32 so that no connecting mechanism is visible other than end cap 64.

In order to disassemble seating unit 10, lateral connecting rungs 14 are slid through posts 30 and 32 in order to expose locking aperture 44 and locking tab 56 and the exterior side of the seat. Locking tab 56 is pressed inward with a pencil or the like to release securing clip 16, which is then removed.

Mounting apertures 38 are slightly undersized with respect to the outer diameter of lateral connecting rungs 14, i.e., approximately 0.001 inch. The material is sufficiently flexible, however, that rungs 14 may then be slid through apertures 38 and rotated. Thereafter, when a person is seated on seating unit 10 rungs 14 frictionally lock into posts 30 and 32. Lateral connecting rungs 14 are sufficiently stiff to support an average person seated upon seating unit 10, but rungs 14 are somewhat flexible in order to resiliently bend under a person's weight. Due to the flexibility of lateral rungs 14, when a person is seated upon seating unit 10, lateral rungs 14 bend downward and a force "F1" (FIG. 4) acts upwardly upon each rung 14. A force "F2" is also exerted downward on the outer end of rungs 14. Force "F1" and force "F2" cause a frictional locking or binding force to be created between lateral connecting rungs 14 and posts 30 or 32 due to the frictional qualities of the material from which lateral rungs 14 and posts 30 and 32 are manufactured. Side assemblies 12 are thus prevented from sliding inward toward each other solely by the frictional locking forces generated between lateral rungs 14 and posts 30 and 32. The same frictional locking forces assist securing clips 16 in preventing the separation of side assemblies 12.

It is to be understood that the above is merely a description of the preferred embodiment and that various modifications and improvements can be made without departing from the spirit of the invention disclosed herein. The scope of the protection afforded is to be determined by the claims which follow and the breadth of interpretation which the law allows.

The embodiments of the invention in which an exclusive property or privilege is claimed are defined as follows:

1. A seating unit, comprising:
   a pair of side assemblies, each said side assembly including a generally upright front leg and a generally upright rear leg, each said side assembly having said front leg and said rear leg interconnected, said rear legs having aligned mounting apertures therethrough, said front legs having aligned mounting apertures therethrough;
   at least two lateral members adapted to interconnect said side assemblies, each said lateral member being passable through aligned mounting apertures in each of said side assemblies, each of said lateral members having at least one hollow end defined by a sidewall and having a locking recess in said sidewall within said hollow end;
   a series of securing clips configured to be secured to said lateral members, each said clip having an enlarged head that will not pass through said aligned mounting apertures and a pair of spaced convergeable clip legs extending from said head, one of said clip legs having a locking tab shaped to be received in one of said locking recesses, and said clip having a relaxed condition, an insertion condition and a locked condition; in said relaxed condition, said clip legs and said locking tab being spaced too wide for telescoping receipt in said hollow ends; in said insertion condition, said clip legs being resiliently converged sufficiently for telescoping receipt in said hollow ends; and in said locked condition, said locking tab being positioned in said locking recess by said one clip leg and the other said clip leg being resiliently converged to bias said locking tab into said locking recess, such that when said seating unit is assembled and said clips are in a locked condition, said clips prevent the separation of said side assemblies from said lateral members by said locking tabs being received in said locking recesses and said enlarged heads abutting an outer side of at least one of said side assemblies;

a seat supported by said lateral members; and said side assemblies being slidable along said lateral members when a person is not seated on said seat, and said side assemblies frictionally locking on said lateral members when a person is seated on said seat so that said side assemblies are selectively convergeable to permit access to said locking tabs positioned in said recesses, whereby said seating unit is provided with the ability to be disassembled to a generally flat condition and assembled by said lateral members being received in said aligned mounting apertures with said clips being received in said lateral member hollow ends.

2. The seating unit of claim 1 wherein at least three lateral members support said seat, wherein each of said side assemblies includes a back rest member, wherein said back rest members have aligned mounting apertures therein and wherein one of said lateral members is passable through the aligned apertures in said back rest members.

3. The seating unit of claim 2 wherein at least two lateral members interconnect said front legs.

4. The seating unit of claim 1 wherein each said locking recess extends through said sidewall of said lateral member to provide an access aperture for said locking tab.

5. The seating unit of claim 4 wherein said front legs and said rear legs each have a cross section large enough to conceal one of said access apertures therein when said seating unit is assembled.

6. The seating unit of claim 5 wherein when said clips are secured to said lateral members, said enlarged heads prevent said lateral members from sliding through said mounting apertures in a first direction; and wherein said lateral members are slidable through said mounting apertures in a second direction opposite said first direction when said clips are secured thereto to provide access to said access apertures for removal of said clips.

7. The seating unit of claim 6 wherein each said lateral member has two hollow ends securable to both said side assemblies by receipt in aligned mounting apertures in both said side assemblies and receipt of one of said clips in each of said hollow ends.

8. A seating unit, comprising:

a pair of side assemblies, each said side assembly including a generally upright front leg and a generally upright rear leg, each said side assembly having said front leg and said rear leg interconnected, said rear legs having aligned mounting apertures therethrough, said front legs having aligned mounting apertures therethrough;

at least two lateral members adapted to interconnect said side assemblies, each said lateral member being passable through aligned mounting apertures in each of said side assemblies, each of said lateral members having at least one hollow end defined by a sidewall and having a locking recess in said sidewall within said hollow end, said locking recess extending through said sidewall of said lateral member;

a series of securing clips configured to be secured to said lateral members, each said clip having an enlarged head that will not pass through said aligned mounting apertures and a pair of spaced convergeable clip legs extending from said head, one of said clip legs having a locking tab shaped to be received in one of said locking recesses and the other of said clip legs having a raised land thereon, and said clip having a relaxed condition, an insertion condition and a locked condition; in said relaxed condition, said clip legs and said locking tab being spaced too wide for telescoping receipt in said hollow ends; in said insertion condition, said clip legs being resiliently converged sufficiently for telescoping receipt in said hollow ends; and in said locked condition, said locking tab being positioned in said locking recess by said one clip leg and the other said clip leg being resiliently converged to bias said locking tab into said locking recess with said locking recess providing an access aperture for said locking tab, said raised land positioned to abut the inside of said sidewall when said clip is in said locked condition, such that when said seating unit is assembled and said clips are in a locked condition, said clips prevent the separation of said side assemblies from said lateral members by said locking tabs being received in said locking recesses and said enlarged heads abutting an outer side of at least one of said side assemblies; and a seat supported by said lateral members, whereby said seating unit is provided with the ability to be disassembled to a generally flat condition and assembled by said lateral members being received in said aligned mounting apertures with said clips being received in said lateral member hollow ends.

9. The seating unit of claim 8 wherein each said lateral member includes a pair of alignment slots extending into said hollow end; and wherein each said clip includes a pair of alignment projections projecting from the sides thereof to be slidably received in said alignment slots.

10. The seating unit of claim 9 wherein said front legs and said rear legs are generally cylindrical in shape; and wherein said clip enlarged heads are smoothly curved to abut and extend around a portion of the perimeter of said cylindrical front legs and said cylindrical rear legs.

11. The seating unit of claim 1 wherein said lateral members are made from a polyvinylchloride material.

12. The seating unit of claim 11 wherein said front legs and said rear legs are hollow elements and made from a polyvinylchloride material.

13. A seating unit comprising:

a seat element;

a plurality of upright support elements for supporting said seat element therebetween, said upright support elements having mounting apertures therethrough;

a lateral connecting member extendable between said upright support elements and receivable in said mounting apertures, said lateral connecting member having a hollow end defined by an inner wall and having a locking recess in said inner wall;

a securing clip shaped to be secured to said lateral connecting member to prevent the separation of said lateral connecting member and one of said upright support elements, said securing clip including an enlarged head which extends outward past the side of said lateral member and abuts said one upright support element, said securing clip including a pair of spaced legs extending from said enlarged head to be received within said lateral connecting member hollow end, and one of said legs including a locking tab shaped for receipt in said locking recess; and said lateral connecting element supports said seat element, said upright support elements are slidable along said lateral connecting member when a person is not seated on said seat element, and said upright support elements frictionally lock on said lateral connecting member when a person is seated on said seat element so that said upright support elements are selectively convergeable to permit access to said locking tabs positioned in said recesses whereby when said lateral connecting member is received in one of said mounting apertures and said securing clip legs are received within said lateral connecting member hollow end, a joint is formed which prevents the end of said lateral connecting member from being pulled out of said upright support element.

14. The seating unit of claim 13 wherein each said locking recess extends through said sidewall of said lateral connecting member to provide an access aperture for said locking tab.

15. The seating unit of claim 14 wherein said front legs and said rear legs each have a cross section large enough to encompass one of said access apertures and dispose said access aperture therein when said seating unit is assembled.

16. The seating unit of claim 15 wherein said lateral members are slidable through said mounting apertures in one direction when said clips are secured thereto to provide access to said access apertures for removal of said clips.

17. The seating unit of claim 16 wherein said clip legs are at least semi-resilient such that said legs are resiliently convergeable and said locking tab on said one clip leg snaps into said locking recess while the other of said clip legs resiliently deformably abuts the inside of said sidewall opposite said locking recess.

18. The seating unit of claim 17 wherein said other clip leg includes a raised land thereon positioned to abut the inside of said sidewall when said clip is received in said hollow end.

19. The seating unit of claim 17 wherein said lateral connecting member includes a pair of alignment slots extending into said hollow end; and said clip includes a pair of alignment projections projecting from the sides thereof to be slidably received in said alignment slots.

20. The seating unit of claim 18 wherein said front legs and said rear legs are generally cylindrical in shape; and said clip enlarged heads are smoothly curved to abut and extend around a portion of the perimeter of said cylindrical front legs and said cylindrical rear legs.

* * * * *